(12) United States Patent
Grimm, III (10) Patent No.: US 10,150,552 B2
(45) Date of Patent: Dec. 11, 2018

(54) FORCED FLOW WATER CIRCULATION COOLING FOR BARGES

(71) Applicant: Southern Towing Company, LLC, Memphis, TN (US)

(72) Inventor: Edward H. Grimm, III, Houston, TX (US)

(73) Assignee: Southern Towing Company, LLC, Memphis, TN (US)

( * ) Notice: Subject to any disclaimer, the term of this patent is extended or adjusted under 35 U.S.C. 154(b) by 119 days.

(21) Appl. No.: 15/183,392

(22) Filed: Jun. 15, 2016

(65) Prior Publication Data

US 2017/0233052 A1 Aug. 17, 2017

Related U.S. Application Data

(60) Provisional application No. 62/295,197, filed on Feb. 15, 2016.

(51) Int. Cl.
*F25D 17/02* (2006.01)
*F25D 1/02* (2006.01)
(Continued)

(52) U.S. Cl.
CPC ............... *B63J 2/14* (2013.01); *B63B 25/08* (2013.01); *F25D 1/02* (2013.01); *F25D 17/02* (2013.01)

(58) Field of Classification Search
CPC ......... B63J 2/08; B63J 2/12; B63J 2/14; B63J 2002/005; B63B 25/08; B63B 2013/005;
(Continued)

(56) References Cited

U.S. PATENT DOCUMENTS 2,382,218 A * 8/1945 Fernstrum ............... F28D 1/022
165/44
2,914,012 A * 11/1959 Hayden .................. F28D 1/022
123/41.44
(Continued)

FOREIGN PATENT DOCUMENTS

| EP | 2163468 | 3/2011 |
| JP | 200025694 | 1/2000 |
| WO | 2014091056 | 6/2014 |

OTHER PUBLICATIONS

Form PCT/ISA/206, Invitation to Pay Additional Fees and, Where Applicable, Protest Fee dated Apr. 17, 2017 for International Patent Application No. PCT/US2017/017634, 2 pages.
(Continued)

*Primary Examiner* — Keith M Raymond
*Assistant Examiner* — Miguel A Diaz
(74) *Attorney, Agent, or Firm* — Clark Hill Strasburger (57) ABSTRACT

The disclosure relates to an open-loop cooling system installed on a refrigerated barge for removing heat from an external heat exchanger in communication with a closed-loop internal cooling system. The system includes an open loop with a pump drawing water from the environment and forcing the water across the outer surface of the heat exchanger to augment existing heat removal due to contact with and flow of water across the heat exchanger due to the motion of the barge. Water is forced across the side faces and inner faces of the cooler to increase heat transfer from the barge closed-loop cooling system to the water environment.

26 Claims, 6 Drawing Sheets

(51) Int. Cl.
*B63J 2/14* (2006.01)
*B63B 25/08* (2006.01)

(58) Field of Classification Search
CPC ... B63H 21/10; F01P 3/20; F01P 3/202; F01P 3/207; F01P 2050/02; F01P 2050/06; F01P 2050/12; F02B 61/045; F28D 1/022; F28D 2021/004; F25D 1/02; F25D 17/02; F25D 11/003; F17C 2221/033
USPC .......................................................... 62/240
See application file for complete search history.

(56) References Cited

U.S. PATENT DOCUMENTS

| | | | |
|---|---|---|---|
| 3,892,209 A | 7/1975 | Amiot | |
| 4,338,993 A * | 7/1982 | Fernstrum | F01P 3/207 165/165 |
| 4,355,518 A * | 10/1982 | Beitner | B63J 2/12 62/240 |
| 4,360,350 A * | 11/1982 | Grover | B63J 2/12 114/140 |
| 4,557,319 A * | 12/1985 | Arnold | F01P 3/207 114/67 R |
| 4,922,724 A * | 5/1990 | Grayson | B63J 2/12 62/135 |
| 5,237,832 A * | 8/1993 | Alston | F24F 5/0017 165/134.1 |
| 5,730,213 A | 3/1998 | Kiser | |
| 6,038,993 A * | 3/2000 | Vento | A01K 97/05 114/255 |
| 6,544,085 B1 | 4/2003 | Menard et al. | |
| 6,544,086 B2 | 4/2003 | Tscherne | |
| 6,688,114 B2 * | 2/2004 | Nierenberg | F17C 5/06 62/50.2 |
| 6,748,906 B1 | 6/2004 | White | |
| 7,114,469 B1 | 10/2006 | Taylor | |
| 7,264,520 B1 | 9/2007 | Taylor | |
| 7,287,493 B2 | 10/2007 | Buck | |
| 7,318,396 B1 * | 1/2008 | Belter | F01P 3/202 123/41.29 |
| 7,370,611 B1 * | 5/2008 | White | F01P 3/12 123/196 AB |
| 7,398,745 B1 * | 7/2008 | White | F01P 5/14 123/41.01 |
| 7,421,983 B1 | 9/2008 | Taylor | |
| 8,020,407 B2 | 9/2011 | Viegas | |
| 8,137,146 B2 | 3/2012 | Cohen | |
| 8,654,302 B2 | 2/2014 | Dunn | |
| 9,170,056 B2 | 10/2015 | Holahan | |
| 9,228,479 B2 | 1/2016 | Bunn | |
| 2002/0162643 A1 * | 11/2002 | Leeson | F01P 3/207 165/41 |
| 2004/0007005 A1 * | 1/2004 | Brunner | B63B 13/02 62/240 |
| 2004/0025516 A1 | 2/2004 | VanWinkle | |
| 2004/0060321 A1 * | 4/2004 | Brunner | B63J 2/04 62/506 |
| 2004/0139899 A1 * | 7/2004 | Scott | B63B 13/00 114/125 |
| 2006/0068657 A1 * | 3/2006 | Csitari | B63H 21/14 440/88 N |
| 2006/0179861 A1 * | 8/2006 | Weber | B63J 2/02 62/240 |
| 2008/0209234 A1 | 8/2008 | Clidaras | |
| 2008/0299848 A1 * | 12/2008 | Sipila | B63J 2/00 440/88 F |
| 2009/0145591 A1 * | 6/2009 | Rericha | B63H 21/10 165/174 |
| 2010/0126402 A1 * | 5/2010 | Pavlow | B63B 13/02 114/173 |
| 2017/0021665 A1 * | 1/2017 | Constantinis | B63B 9/00 |

OTHER PUBLICATIONS

Form PCT/ISA/210, Patent Cooperation Treaty (PCT) International Search Report dated Jun. 6, 2017 for International Patent Application No. PCT/US2017/017634 (including the Search History Document), 9 pages.
Form PCT/ISA/237, Patent Cooperation Treaty (PCT) Written Opinion of the International Searching Authority, or the Declaration dated Jun. 6, 2017 for International Patent Application No. PCT/US2017/017634, 5 pages.

* cited by examiner

FORCED FLOW WATER CIRCULATION COOLING FOR BARGES

BACKGROUND OF THE DISCLOSURE

1. Field of Disclosure

The present disclosure relates to cooling barges, in particular, enhancing closed loop cooling systems by improving the effectiveness of heat removal through hull mounted coolers on refrigerated barges.

2. Description of the Related Art

Barges are used to transport cargo on the ocean and inland waterways. When refrigeration of the cargo is desirable or required, controlling the temperature inside the barge requires specialized equipment, additional costs, and energy to maintain the appropriate low temperatures during transport or when the barge is docked. Cargoes such as liquid natural gas (LNG), ammonia or anhydrous ammonia, and liquid propane gas (LPG) are stored as liquids at lower temperatures and, in some instances, high pressures. Anhydrous ammonia stored as a liquid near normal atmospheric pressures must be cooled below −28 degrees F. (−33 degrees C.). Typically, boats and barges include coolers mounted on or near the outer hull (heat exchangers) below the water line and use the surrounding water at an ambient water temperature as a heat sink. Thus, the heat exchangers remove internal heat of the barge to the ambient temperature water environment. The internal heat may be due to the cargo, the refrigeration system used to maintain the cargo at low temperatures, and additional equipment operating in the refrigerated barge.

Removing the heat (cooling) may be performed by a closed-loop cooling system that pumps a fluid that circulates through pipes and into internal systems and bulkheads to draw heat out of the interior of the barge to the outer hull, where a heat exchanger may be disposed. Thus, the heat moves from the interior of the barge to the heat exchanger by way of the closed-loop cooling system. One or more suitable heat exchangers, such as box coolers, cooling fins, or grid coolers, may be disposed on or in the outer hull. Contact with the surrounding water provides cooling of the heat exchanger so that heat flows out of the barge and into the ambient environment. The heat exchanger is cooled by conduction (when the barge is motionless or only slightly moving relative to the water) or by convection and conduction (when the barge is moving relative to the water) due to the surrounding water (i.e. sea or river water) in contact with the outer surface of the cooler. The heat exchanger removes heat at its lowest rate when the barge is motionless, since there is no heat removal by convection. Since coolers are usually mounted directly to the outside of the hull, only the outer side of the cooler is in contact with the flow of water.

One of the shortcomings closed-loop cooling systems with outer hull mounted heat exchangers on barges is that the effectiveness of the heat transfer from the barge to the water is heavily depends on movement of the barge through the water. While heat will transfer across any temperature differential, the rate of heat transfer is relatively low when the barge is not moving relative to the water, since only cooling by conducting heat through the water takes place.

A shortcoming of barges with closed-loop cooling systems is that cargo loading is limited by the rate that the cargo can be effectively cooled to a specified temperature. When the barge is docked for loading, the cooling system is least effective, and, the heat load added by the loading of cargo can require the suspension of loading activities until the barge is adequately cooled.

Another shortcoming of barges with closed-loop cooling systems is that the heat transfer maximum is completely dependent on the temperature differential between the closed-loop cooling system and the ambient water temperature for a given relative speed.

Another shortcoming of barges with closed-loop cooling systems and hull mounted coolers is that the ambient temperature water generally only flows across the outer side surface of the cooler, such that heat is not being effectively removed from the inner side of the cooler.

Refrigeration equipment and fuel to operate said refrigeration equipment represent a substantial cost in the operation of a refrigerated barge. Also loading delays due to cargo refrigeration demands exceeding the cooling capacity of the barge's refrigeration system coupled with its cooling system, present scheduling problems and additional costs.

What is needed is an open-loop cooling system to enhance the performance of the existing closed-loop cooling system and heat exchanger. What is also needed is cooling of the inner side of the heat exchanger to improve heat removal to the ambient temperature water. What is also needed is an open-loop cooling system that operates by convection when the barge is immobile relative to the water.

BRIEF SUMMARY OF THE DISCLOSURE

In aspects, the present disclosure is related to a system for cooling a water going barge, and, in particular, increasing the effectiveness of the heat exchange between a closed-loop cooling system and the ambient water environment.

One embodiment according to the present disclosure includes a refrigerated barge, comprising: an outer hull; a closed-loop cooling system disposed within the outer hull; a heat exchanger in fluid communication with the closed-loop cooling system, wherein the heat exchanger is disposed in a recessed section of the outer hull with a gap between the outer hull and an inner face of the heat exchanger; and an open-loop cooling system in fluid communication with heat exchanger, the open loop cooling system comprising: a first piping line between an inlet in the outer hull and an outlet in the recessed section; and a pump disposed along the first piping line. The open-loop cooling system may include a constriction segment between the first piping line and the outlet. The recessed section may include forward, aft, port, starboard, and back walls, and the outlet may be disposed in the forward wall. The open-loop cooling system may include a second piping line bypassing the pump and disposed between the inlet and the outlet that includes valves on the first and second piping lines and a controller for controlling the bypassing of the pump. The bypassing of the pump may be determined by one or more of a speed of the refrigerated barge, a temperature of a cargo stored on the refrigerated barge, and a temperature difference between a temperature of a fluid in the closed-loop cooling system and a temperature of water surrounding the outer hull. The heat exchanger may be a grid cooler.

Another embodiment according to the present invention includes a refrigerated barge, comprising: an outer hull; an inner hull; a closed-loop cooling system disposed within the inner hull; a heat exchanger in fluid communication with the closed-loop cooling system, wherein the heat exchanger is disposed between the outer hull and the inner hull a gap between the inner hull and an inner face of the heat exchanger; and an open-loop cooling system in fluid communication with heat exchanger, the open loop cooling system comprising: a first piping line between an inlet in the outer hull and an outlet in the recessed section; and a pump disposed along the piping, wherein the outer hull has a plurality of slits to allow the exit of water entering through the inlet. The open-loop cooling system may include a constriction segment disposed between the piping and the outlet. The recessed section includes forward, aft, port, starboard, and back walls and the outlet may be disposed in the forward wall. The open-loop cooling system may include a second piping line bypassing the pump and disposed between the inlet and the outlet, wherein valves on the first and second piping lines and a controller are used to control the bypassing of the pump. The bypassing of the pump may be based on one or more of: a speed of the refrigerated barge, a temperature of a cargo stored on the refrigerated barge, and a temperature difference between a temperature of a fluid in the closed-loop cooling system and a temperature of water surrounding the outer hull. The heat exchanger may be a grid cooler.

Another embodiment according to the present disclosure includes a method of cooling a refrigerated barge, the method comprising: supplying a flow of water from the environment to a side of a heat exchanger facing an inner hull of a refrigerated barge, wherein the heat exchanger is disposed between the inner hull and an outer hull of the refrigerated barge, wherein the heat exchanger is mounted with a gap between the inner hull and the heat exchanger to allow for the passage of water. The method may also include constricting the flow of the water to increase its velocity across the heat exchanger. The supplying of the water may include directing a natural flow of water to the inner side of the heat exchanger or pumping the water. The method may also include switching between pumping the water and allowing the natural flow of water based on predetermined criteria. The switching may include opening/closing a valve dedicated to pumping the water and closing/opening a valve dedicated to allowing the natural flow of the water. The heat exchanger may be a grid cooler.

Another embodiment according to the present disclosure includes a method of cooling a refrigerated barge, the method comprising: supplying a flow of water from the environment to an inner side of a heat exchanger disposed in a recessed section of an outer hull of the refrigerated barge, wherein the heat exchanger is mounted with a gap between the recessed section and the heat exchanger to allow for the passage of water. The method may include constricting the flow of the water to increase its velocity across the heat exchanger. The method may include pumping or allowing the flow of water to the inner side of the heat exchanger. The method may include switching between pumping the water and allowing the natural flow of water based on predetermined criteria. The switching may include opening/closing a valve dedicated to pumping the water and closing/opening a valve dedicated to allowing the natural flow of the water. The heat exchanger may be a grid cooler.

BRIEF DESCRIPTION OF DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Generally, the present disclosure relates to a water-going vessel configured for the transport of refrigerated cargo, such as, but not limited to, LNG, ammonia, and LPG. Specifically, the present disclosure is related to supplementing the cooling power/efficiency of a closed-loop cooling system with an open-loop cooling system.

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Figure 1A:
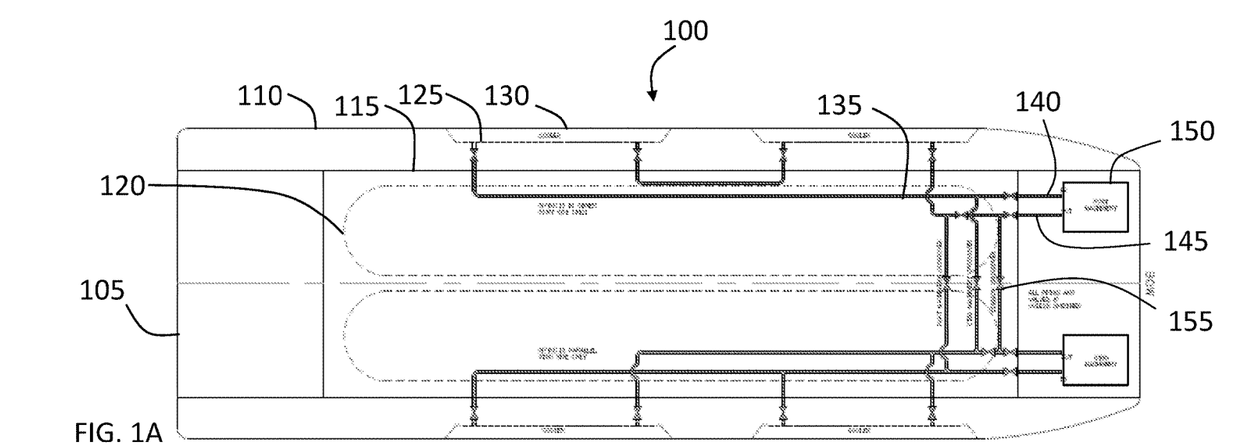
FIG. 1A shows a diagram of a refrigerated barge with a machinery-driven ("active") closed-loop circulating system for cooling.
Figure 1B:
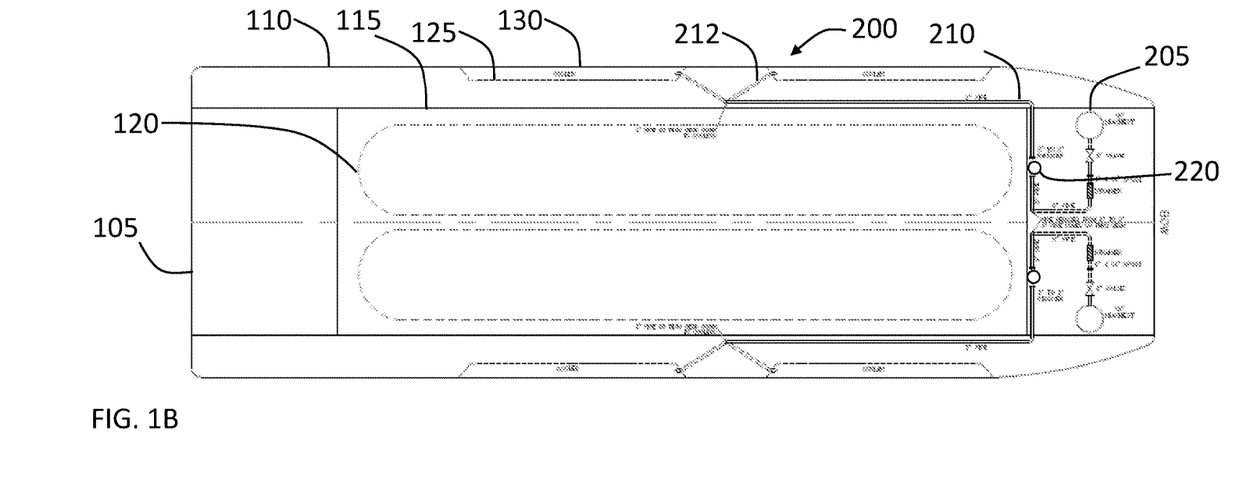
FIG. 1B shows a diagram of a refrigerated barge with an open-loop forced flow water circulating system.

FIGS. 1A and 1B show cooling systems 100, 200 (closed-loop water cooling system 100 and open-loop water cooling system 200) that are incorporated into a refrigerated cargo barge 105 to form a combined barge cooling system. In one embodiment according to the present disclosure the cooling systems 100, 200 may be operated separately or together. The separate FIGS. 1A and 1B are used to clearly show the elements of each of the cooling systems 100, 200 as claimed by the applicant.

FIG. 1A shows the refrigerated cargo barge 105 with the closed-loop water cooling system 100. The barge 105 comprises an outer hull 110, an inner hull 115, and one or more insulated tanks 120 for storing cargo. The insulated tanks 120 are maintained at refrigerated temperatures based on the type of cargo being transported as would be understood by a person of ordinary skill in the art. Refrigeration is provided by a suitable refrigeration system (not shown) which removes heat from the cargo and transfers the heat into the interior of the barge 105. The outer hull 110 includes one or more recessed sections 125, which allow heat exchangers (coolers) 130 to be disposed on the outside of the outer hull 110, and allowing the non-recessed portion of the outer hull 110 to protect the coolers 130 from physical damage while the barge 105 is in the water. The closed-loop water cooling system 100 includes the coolers 130, a main cooling loop 135 that circulates water through the coolers 130 from an inlet pipe 140 and back to an outlet pipe 145. Circulation is provided by a pump and associated powered machinery 150.

The entire cooling system (the main cooling loop 135, the inlet 140, the outlet 145, and the pump 150) form a closed-loop system that moves heat from the interior of the barge 105 to the coolers 130 and into the water environment. The main cooling loop 135 may be divided into port and starboard sides, each servicing the coolers 130 on the port and starboard sides of the barge 105, respectively. The two halves of the main cooling loop 135 may be isolated by a series of isolation valves 155. Each half of the main cooling loop 135 may have its own pump 150.

FIG. 1B shows the refrigerated cargo barge 105 with the open-loop cooling system 200 disposed within. The system 200 includes additional features that may be added to the system 100, thus systems 100 and 200 may share some elements in common, including the coolers 130. The coolers 130 are, in addition to being in communication with main cooling loop 135 (FIG. 1A), in communication the open-loop cooling system 200 with one or more pipes 212 branching off of an open-cooling loop 210. The open-cooling loop 210 is in communication with one or more openings (sea chests) 205 in the outer hull 110 that provide access to surrounding water for supplying water to the open-cooling loop 210 and the coolers 130. The water may be forced through the open-cooling loop 210 using a pump 220. Similar to the main cooling loop 135, the open-cooling loop 210 may have independent port and starboard sections that feed coolers 130 on the port and starboard sides, respectively.

The combination of the closed-loop water cooling system 100 shown in FIG. 1A and the open-loop water cooling system 200 shown in FIG. 1B provide versatile cooling options for the transporting cargo in the tanks 120 on the barge 105. Heat may be more effectively transferred out of the barge 105 through the coolers 130 when both systems 100, 200 are operating. Under conditions where silt or other contaminants from the water environment may enter the open-loop cooling system 200, such as in inland waterways, the open-loop cooling system 200 may be shut down and the lines purged to prevent damage or clogging; however, the closed-loop cooling system 100 may continue to operate.

Figure 2A:
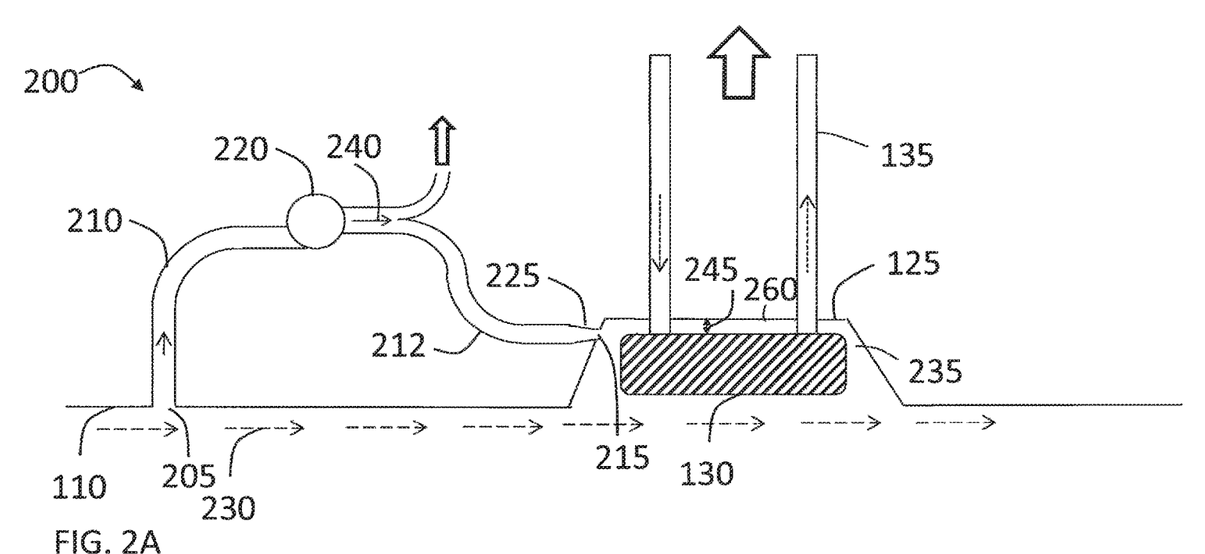
FIG. 2A shows a close up diagram of an open-loop forced flow water circulating system for use with the refrigerated barge of FIG. 1B integrated with the closed-loop cooling system of FIG. 1A according to one embodiment of the present disclosure.

FIG. 2A shows a close up diagram of one embodiment of an open-loop cooling system 200. In FIG. 2A, the open-loop cooling system 200 is directed to increasing the removal of heat from the cooler 130 by increasing the flow of water across surfaces of the cooler 130. In one embodiment, the cooler 130 may be any suitable heat exchanger, such as a GRIDCOOLER® keel cooler, manufactured by R.W. Fernstrum & Company in Menominee, Mich. The system 200 includes the piping 210 between the opening (inlet) 205 in the outer hull 110 of the barge 105 and an opening (outlet) 215 in the recessed section 125. The piping 210 includes, but is not limited to, tubulars, valving, and elbows for providing fluid communication between the inlet 205 and the outlet 215 as would be understood by a person of ordinary skill in the art. The pump 220 disposed along the piping 210 moves water from the inlet 205 to the outlet 215, augmenting natural flow velocity of the water toward the recessed section 125. The piping 210 may branch downstream of the pump 220 into pipes 212 that supply water to different recessed sections 125. The piping 212 may include an optional constricting piping segment 225, such as a piping reducer, to reduce the cross-sectional area of the piping 212 and, thus, further increase the water flow velocity at or near the outlet 215. When the barge 105 is in motion, the water flow outside the outer hull 110 is shown by arrows 230, though it is possible for the water flow velocity outside the outer hull 110 to be zero when the barge 105 is motionless.

Figure 2B:
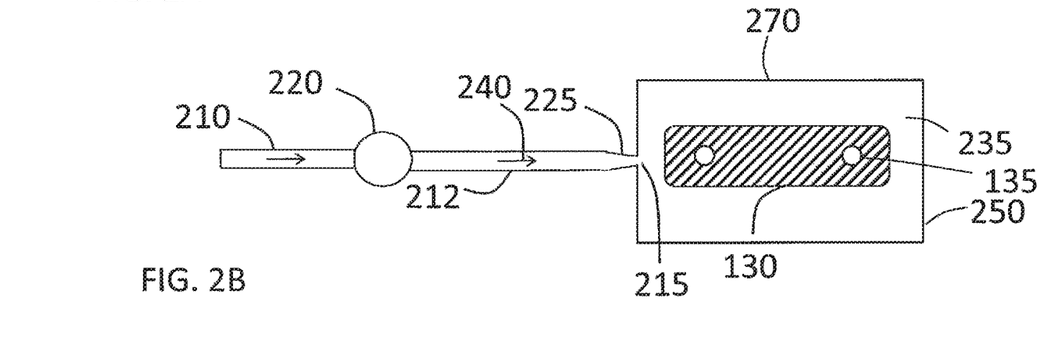
FIG. 2B shows a top view of the open-loop forced flow water circulating system for use with the refrigerated barge of FIG. 2A.

To clarify orientation, the direction opposing the normal direction of the water flow 230 is upstream or forward (toward the bow of the barge 105), and the normal direction of the water flow 230 is downstream or aft (toward the stern of the barge 105) as would be understood by a person of ordinary skill in the art. While the inlet 205 is shown upstream/forward of the cooler 130, this is exemplary and illustrative only, as the inlet 205 may be located downstream/aft of the cooler 130 or parallel so long as the pump 220 imparts sufficient velocity to water 240 in the piping 210 so that the water 240 is forced through the pipe 212 and into a volume 235 formed by the recessed section 125, which is also where the cooler 130 is disposed. As a result, the 240 water flow exiting the outlet 215 augments the flow of water 230 already removing heat from the cooler 130, and an overall increased flow of water across the cooler 130 means in increased removal of heat from the cooler 130, which increases the capacity of the cooler 130 to remove heat from the main cooling loop 135 of the closed-loop cooling system. FIG. 2B shows a top view of system 200.

Further, the cooler 130 may be separated from the recessed section 125 by a gap 245 that allows the water flow 240 to pass between the cooler 130 and recessed section 125 and through openings in the cooler 130. The recessed section 125 is also shown with side walls 250 that extend far enough away from the normal plane of the outer hull 110 so that the cooler 130 is itself flush with or recessed from the normal plane. The side walls 250, as shown, are angled, such that the recessed section 125 has trapezoidal prismatic characteristics, including a back wall 260; however, this is illustrative and exemplary only, since the recessed section 125 may have any shape (such as a rectangular box, an ovoid section, or a hemisphere) so long as the cooler 130, when disposed in the recessed section 125, does not extend beyond the normal plane of the outer hull 110.

The barge 105 may have one or more coolers 130 along with an associated recessed section 125 for placement of the cooler 130. As would be understood by a person of ordinary skill in the art, the embodiments described in this disclosure can be multiples as necessary to address the cooling needs a barge requiring a plurality of coolers 130. Further, it is contemplated that the equipment for providing the flow of water to the recessed sections 125 may be central or distributed to varying degrees. As shown in FIGS. 1B and 2, a single inlet 205 and pump 220 may supply multiple coolers 130; however, this is illustrative and exemplary only, as a single inlet 205 may supply water to multiple pumps 220 for multiple cooler 130 or each cooler 130 may have its own dedicated inlet 205 and pump 220. Thus, the system 200, and other systems described herein, may be duplicated in the hull of the barge as necessary (distributed) and/or some components may be centralized, based on hull design, cooling requirements, cost and engineering goals, and other considerations as understood by persons of ordinary skill in the art.

Figure 3A:
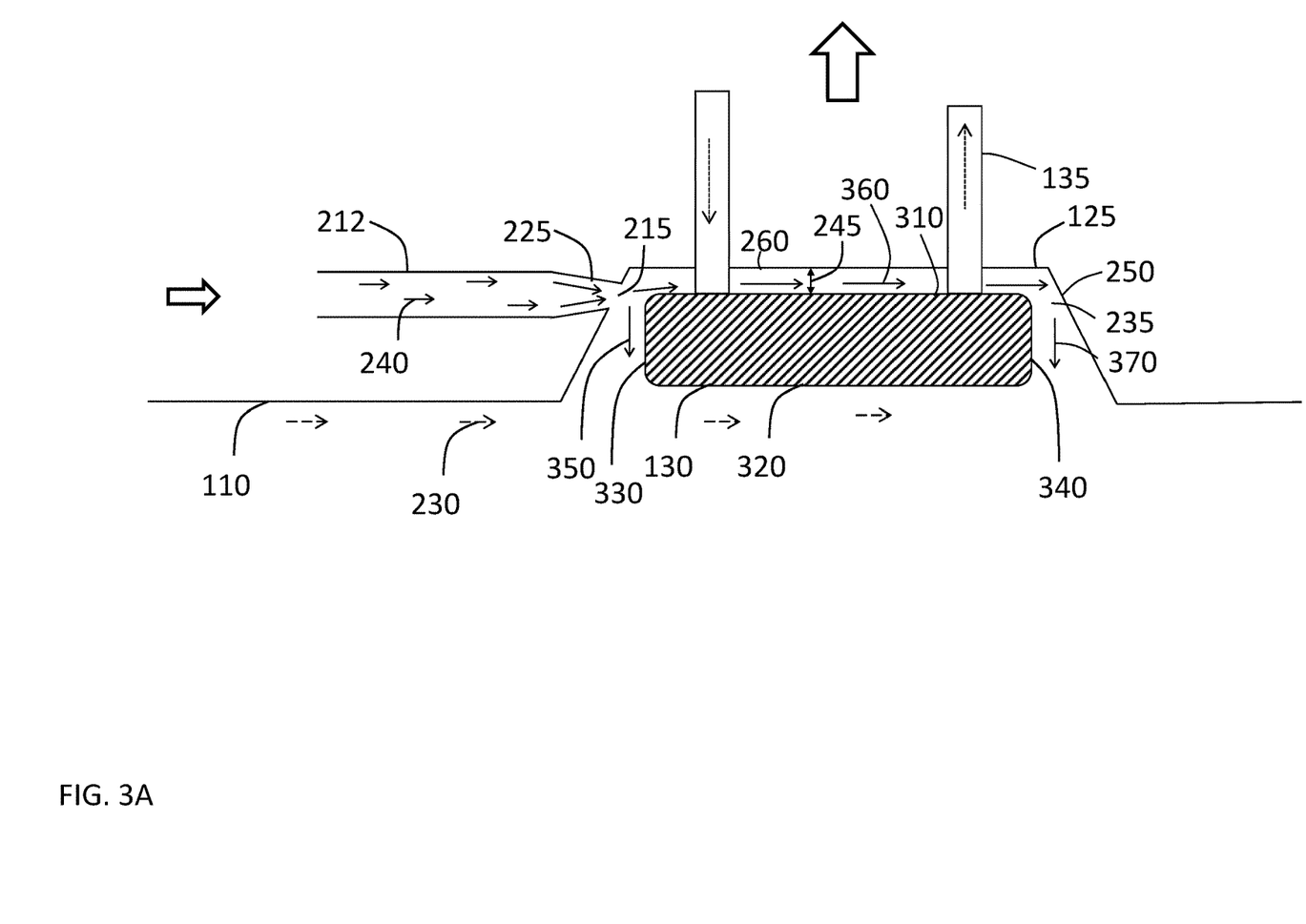
FIG. 3A shows a close-up of the water circulation path to the cooler for use with the open-loop system of FIG. 2A.

FIG. 3A shows a close up of the recessed section 125 and cooler 130 disposed therein and the flows of waters for removing heat from the cooler 130. The water flow 240 from the piping 212 (and optionally through constricting segment 225) is forced into the volume 235 in which the cooler 130 is disposed. The cooler 130 has an inner face 310 between the cooler 130 and the recessed section 125, an outer face 320 that is opposite the inner face 310, a forward side face 330, and an aft side face 340 (as well as port and starboard faces that are not shown). The typical water flow 230 moves water across the outer face 320 only. The water flow 240 from the open-loop system 220 enters the recessed section 125 through the outlet 215. As shown, a water flow 350 is in contact with the forward side face 330, a water flow 360 is in contact with the inner side face 310, and a water flow 370 is in contact with aft side face 340. By increasing the surface area of the cooler 130 exposed to flowing water, the heat removal from the cooler 130 is increased, making the cooler 130 more effective in removing heat from the main cooling loop 135 of the closed-loop cooling system. Further, since water flow 240 is forced and controlled by the pump 220, the water flows 350, 360, 370 even when the barge 105 is not moving and the water flow 230 along the outer face 320 is near zero, where the cooler 130, is least effective when relying on heat transfer through the outer face 320 alone.

While the outlet 215 is shown in the one of the walls 250 forward of the cooler 130, this is illustrative and exemplary only, as the outlet 215 may be disposed in one of the walls 250 aft of the cooler 130, a side wall 270 to the port or starboard side of the cooler 130, or in the back wall 260 as would be understood by a person of ordinary skill in the art, such that the water flows behind and around the cooler 130 as shown by arrows 320 and 330. A person of ordinary skill in the art would also understand that the water flow 240 may move across surfaces of the cooler 130 to the port or starboard (not shown) as well as forward and aft. While a single outlet 215 is shown, it is contemplated that a plurality of outlets 215 may be present and distributed along one or more of the walls 250, 260.

Figure 3B:
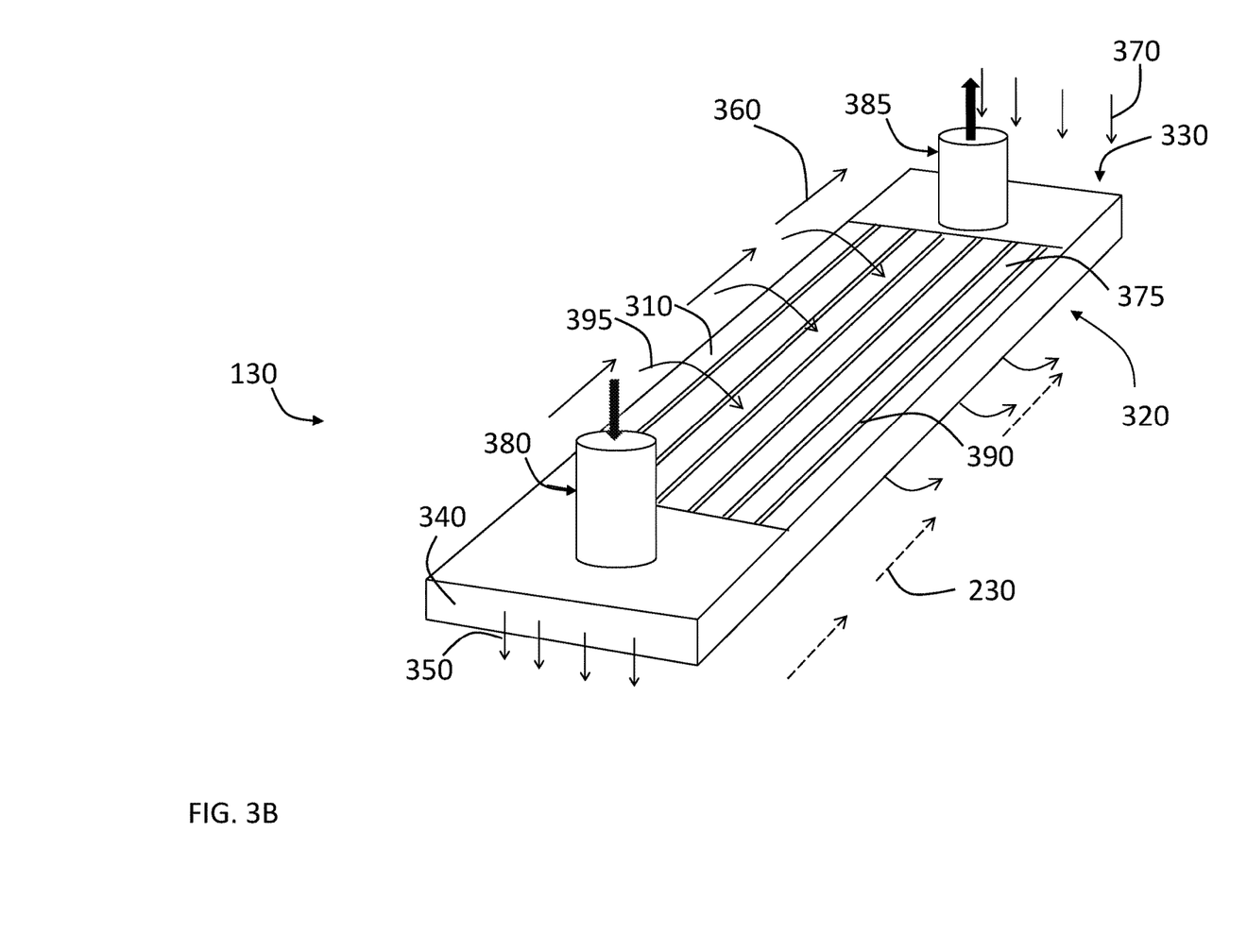
FIG. 3B shows a close-up of the water circulation paths around and through the cooler for use with the open-loop system of FIG. 2A.

FIG. 3B shows a close up of the water flow patterns for the cooler 130 in one embodiment according to the present disclosure. The cooler 130 may be made up of stacked fins 375, each of which is in fluid communication with the main cooling loop 135. Water entering into the cooler 130 at the cooler inlet 380 passes through fins 375 and out a cooler outlet 385. There are gaps 390 between adjacent fins 375 so that water can move through the inner face 310 to the outer face 320. With water flow 360 moving across the inner face 310 and water flow 395 moving from the inner face 310 to the outer face 320 through the gaps 390, cooling efficiency is increased since a greater surface area of the cooler 130 is in contact with the open-loop water flow 240. While not shown with arrows, the other sides of the cooler 130 (not numbered 330 and 340) also have water flowing across them to provide additional cooling. While the fins 375 are shown stacked with the gaps 390 perpendicular to the inner face 310, this is illustrative and exemplary only, as the fins 375 and gaps 390 may be disposed at a non-perpendicular angle to the inner face 310. In some embodiments, the angle of the fins 375 and gaps 390 may be the same angle as the sides of one of the sides of the recessed section 125

Figure 4:
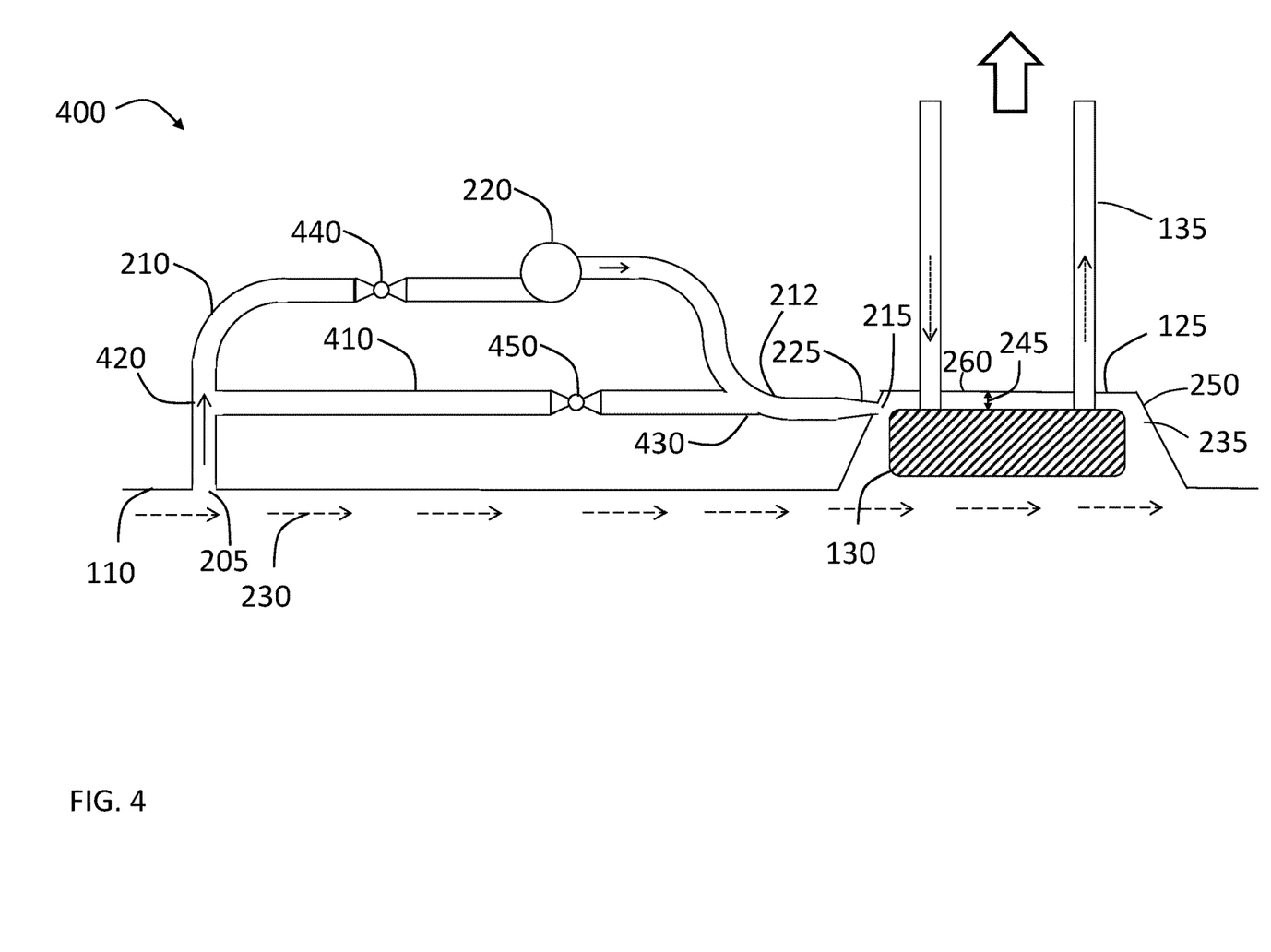
FIG. 4 shows a close up diagram of an open-loop forced flow water circulating system with a parallel open-loop passive flow water circulating system for use with the refrigerated barge of FIG. 1A according to one embodiment of the present disclosure.

FIG. 4 shows another embodiment of an open-loop cooling system 400 that includes a switchable passive cooling branch. The open-loop cooling system 400 may be with the closed-loop water cooling system 100. The flow characteristics in the recessed section 125 for system 400 are the same as shown for system 200 in FIG. 3. The system 400 includes the piping 210 between an inlet 205 in the outer hull 110 of the barge 105 and the outlet 215 in the recessed section 125, as well as the pump 220 disposed along the piping 210 to move water from the inlet 205 to the outlet 215, augmenting natural flow velocity toward the recessed section 125. A parallel branch 410 of piping is disposed along the piping 210 and branches off at a piping tee 420 and rejoins the piping 210 at a piping tee 430. The parallel branch 410 bypasses the pump 220. The system 400 also includes a valve 440 disposed on the piping 210 between the piping tee 420 and the piping tee 430 and a valve 450 on the parallel branch 410 between the piping tee 420 and the piping tee 430. The valves 440, 450 are disposed so that flow between the inlet 205 and the outlet 215 can be switched between using the pump 220 ("forced flow mode") and not using the pump 220 ("passive flow mode"). Downstream of the piping tee 430, shown as piping 212 provides a conduit for the water flow 240 to the outlet 215. The piping 212 may include the optional constricting piping segment 225, such as a piping reducer, to reduce the cross-sectional area of the piping 210 and, thus, further increase the water flow velocity at or near the outlet 215. While the inlet 205 is shown upstream/forward of the cooler 130, this is exemplary and illustrative only, as the inlet 205 may be located downstream/aft of the cooler 130 or parallel so long as the pump 220 imparts sufficient velocity to water 240 in the piping 210 so that the water 240 is forced into a volume 235 formed by the recessed section 125, which is also where the cooler 130 is disposed. As a result, the 240 water flow exiting the outlet 215 augments the flow of water 230 already removing heat from the cooler 130, and an overall increased flow of water across the cooler 130 means in increased removal of heat from the cooler 130, which increases the capacity of the cooler 130 to remove heat from the main cooling loop 135 of the closed-loop cooling system. While not shown, is contemplated that the output of the pump 220 may branch into multiple pipes 212 to supply multiple recessed sections 125, similar to FIGS. 1B and 2.

In operation, in forced flow mode, when the valve 440 is open and the valve 430 is closed, the system 400 operates substantially the same way as the system 200. In passive flow mode, when the valve 440 is closed and the valve 430 is open, the water flow 240 is controlled by the motion of the barge 105 through the water. This means that passive flow mode provides little or no additional cooling while the barge 105 is motionless; however, when the barge 105 is moving, the water flow through the parallel branch 410 augments the cooling of the cooler 130 since the inner face 310, forward side face 330, and aft side face 340 will receive additional water flow from the open-loop system 400 when in passive flow mode. Passive flow mode is particularly useful for augmenting cooling based on the outer face 320 when the pump 220 is shutdown due to maintenance, equipment failure or simply because cooling is adequate without the pump 220 operating. The system 400 may include a controller (not shown) that switches the valves 440, 450 and the pump 220 between forced flow mode and passive flow mode based on sensor or manual inputs, including, but not limited to, as an indicator of speed of the barge 105 through the water, a temperature of the interior of the barge 105 relative to either the ambient water temperature or the cooling demands of the refrigerated cargo, and a temperature difference between a temperature of a fluid in the closed-loop cooling system 100 and a temperature of water surrounding the outer hull 110.

Figure 5:
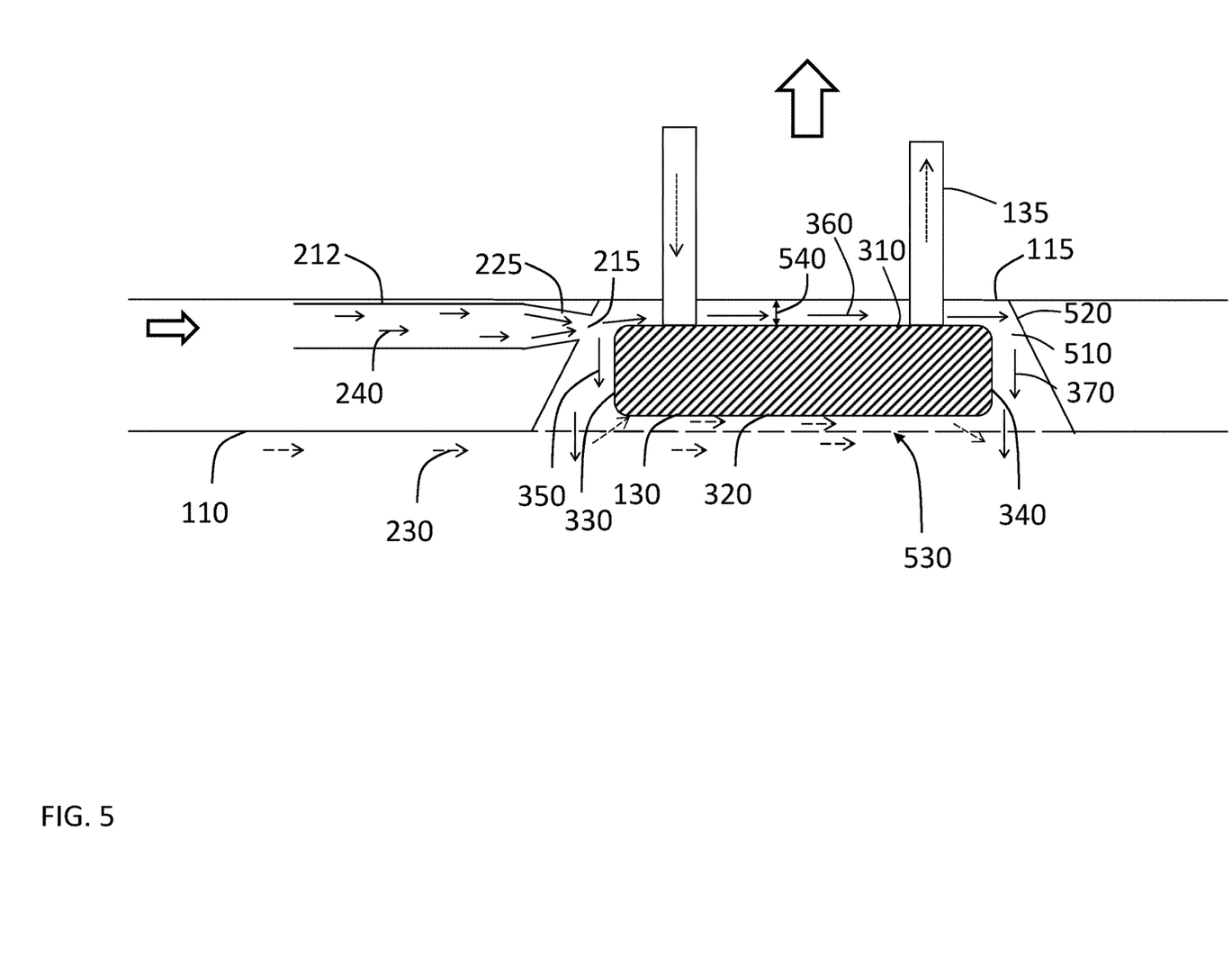
FIG. 5 shows a close-up of an alternative placement of the cooler and water circulation for use with the open-loop systems of FIG. 1B and FIG. 4.

FIG. 5 shows a close up of the closed-loop system 200, 400 in a barge 105 where the cooler 130 is disposed between the inner hull 115 and the outer hull 110. The water flow 240 from the piping 212 (and optionally through constricting segment 225) is forced into a volume 510 formed by the inner hull 115, the outer hull 110, and a plurality of side walls 520, wherein the cooler 130 is disposed. Herein, the outlet 215 is in one of the side walls 520 or in the inner hull 115. While a single outlet 215 is shown, it is contemplated that a plurality of outlets 215 may be present and distributed along one or more of the walls 520 and the inner hull 115. As in FIG. 2A, the volume 510 is shown as a trapezoidal prism in shape, but may be any suitable shape as would be understood by a person of ordinary skill in the art. The outer hull 110 includes a plurality of openings 530, such as, but not limited to, slits, slots, or holes, that allow water entering the volume 510 to exit the outer hull 110 and take heat with the exiting water and away from the cooler 130. The plurality of openings 530 also allows the water flow 240 to contact the outer surface 320 to remove heat. The cooler 130 may be separated from the inner hull 115 by a gap 540 that allows water from the outlet 215 to flow across the inner surface 310 of the cooler 130.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A refrigerated inland waterway barge, comprising:
    an outer hull;
    a liquid water-based closed-loop cooling system disposed within the outer hull of the refrigerated inland waterway barge;
    a heat exchanger in fluid communication with the closed-loop cooling system, wherein the heat exchanger is disposed in a recessed section of the outer hull and outside of the outer hull of the refrigerated inland waterway barge with a gap between the outer hull and an inner face of the heat exchanger; and
    an open-loop cooling system in fluid communication with the heat exchanger, the open-loop cooling system comprising:
        a first piping line between an inlet in the outer hull and an outlet in the recessed section of the refrigerated inland waterway barge, wherein the outlet is positioned at least partially aligned with the gap; and
        a pump disposed along the first piping line.

2. The open-loop cooling system of claim 1, further comprising:
    a constriction segment disposed between the first piping line and the outlet.

3. The refrigerated barge of claim 1, wherein the recessed section includes forward, aft, port, starboard, and back walls, and wherein the outlet is disposed in the forward wall.

4. The open-loop cooling system of claim 1, further comprising:
    a second piping line bypassing the pump and disposed between the inlet and the outlet.

5. The open-loop cooling system of claim 4, further comprising:
    a valve on the first piping line;
    a valve on the second piping line; and
    a controller configured to actuate the valves on the first and second piping lines to switch a water flow in the first piping line ON/OFF.

6. The open-loop cooling system of claim 5, wherein the controller is configured to switch the water flow in the first piping line ON/OFF based on at least one of: a speed of the refrigerated barge, a temperature of a cargo stored on the refrigerated barge, and a temperature difference between a temperature of a fluid in the closed-loop cooling system and a temperature of water surrounding the outer hull.

7. The refrigerated barge 1, wherein the heat exchanger is a grid cooler.

8. A refrigerated inland waterway barge, comprising:
    an outer hull of the refrigerated inland waterway barge;
    an inner hull of the refrigerated inland waterway barge;
    a liquid water-based closed-loop cooling system disposed within the inner hull;
    a heat exchanger in fluid communication with the closed-loop cooling system and immersed in an ambient water environment, wherein the heat exchanger is disposed between the outer hull and the inner hull with a gap between the inner hull and an inner face of the heat exchanger; and
    an open-loop cooling system in fluid communication with the heat exchanger, the open-loop cooling system comprising:
        a first piping line between an inlet in the outer hull and an outlet in the outer hull positioned at least partially aligned with the gap; and
        a pump disposed along the piping,
        wherein the outer hull has a plurality of slits to allow the exit of water entering through the inlet.

9. The open-loop cooling system of claim 8, further comprising:
    a constriction segment disposed between the piping and the outlet.

10. The refrigerated barge of claim 8, wherein the recessed section includes forward, aft, port, starboard, and back walls, and wherein the outlet is disposed in the forward wall.

11. The open-loop cooling system of claim 8, further comprising:
    a second piping line bypassing the pump and disposed between the inlet and the outlet.

12. The open-loop cooling system of claim 11, further comprising:
    a valve on the first piping line;
    a valve on the second piping line; and
    a controller configured to actuate the valves on the first and second piping lines to switch a water flow in the first piping line ON/OFF.

13. The open-loop cooling system of claim 12, wherein the controller is configured to switch the water flow in the first piping line ON/OFF based on at least one of: a speed of the refrigerated barge, a temperature of a cargo stored on the refrigerated barge, and a temperature difference between a temperature of a fluid in the closed-loop cooling system and a temperature of water surrounding the outer hull.

14. The refrigerated barge 8, wherein the heat exchanger is a grid cooler.

15. A method of cooling a refrigerated inland waterway barge, the method comprising:
    supplying a flow of water from an ambient water environment to a side of a heat exchanger immersed in the ambient water environment and facing an inner hull of a refrigerated inland waterway barge, wherein the heat exchanger is in fluid communication with a liquid water-based closed-loop cooling system and disposed between the inner hull and an outer hull of the refrigerated inland waterway barge, wherein the heat exchanger is mounted with a gap between the inner hull and the heat exchanger to allow for the passage of water, wherein at least part of the flow of water is into the gap.

16. The method of claim 15, further comprising:
    constricting the flow of the water to increase a velocity of the water across the heat exchanger.

17. The method of claim 15, wherein supplying the water comprises:
  pumping the water.

18. The method of claim 15, wherein supplying the flow of water comprises:
  pumping the water; or, alternatively, allowing a natural flow of the water; and
  switching between pumping the water and allowing the natural flow of water based on predetermined criteria.

19. The method of claim 18, wherein the switching comprises opening/closing a valve dedicated to pumping the water and closing/opening a valve dedicated to allowing the natural flow of the water.

20. The method of claim 15, wherein the heat exchanger is a grid cooler.

21. A method of cooling a refrigerated inland waterway barge, the method comprising:
  supplying a flow of water from an ambient water environment to an inner side of a heat exchanger in fluid communication with a liquid water-based closed-loop cooling system and disposed in a recessed section of an outer hull and outside of the outer hull of the refrigerated inland waterway barge, wherein the heat exchanger is mounted with a gap between the recessed section and the heat exchanger to allow for the passage of water, wherein at least part of the flow of water is into the gap.

22. The method of claim 21, further comprising:
  constricting the flow of the water to increase a velocity of the water across the heat exchanger.

23. The method of claim 21, wherein supplying the water comprises:
  pumping the water.

24. The method of claim 21, wherein supplying the flow of water comprises:
  pumping the water; or, alternatively, allowing a natural flow of the water; and
  switching between pumping the water and allowing the natural flow of water based on predetermined criteria.

25. The method of claim 24, wherein the switching comprises opening/closing a valve dedicated to pumping the water and closing/opening a valve dedicated to allowing the natural flow of the water.

26. The method of claim 21, wherein the heat exchanger is a grid cooler.

* * * * *